United States Patent [19]

Heithoff et al.

[11] 4,055,407

[45] Oct. 25, 1977

[54] APPARATUS FOR THE MANUFACTURE OF FLAT GLASS HAVING A GLASS REFRACTORY DELIVERY PIECE AND METHOD OF INSTALLATION

[75] Inventors: Robert B. Heithoff, Wichita Falls, Tex.; George A. Pecoraro, Lower Burrell, Pa.

[73] Assignee: PPG Industries, Inc., Pittsburgh, Pa.

[21] Appl. No.: 737,318

[22] Filed: Nov. 1, 1976

[51] Int. Cl.² ............................................. C03B 18/02
[52] U.S. Cl. ......................................... 65/27; 65/99 A; 65/182 R
[58] Field of Search ..................... 65/27, 65 A, 182 R, 65/99 A

[56] References Cited

U.S. PATENT DOCUMENTS

| | | | |
|---|---|---|---|
| 3,594,147 | 7/1971 | Galey et al. | 65/182 R |
| 3,884,665 | 5/1975 | Edge et al. | 65/99 A |

*Primary Examiner*—Arthur D. Kellogg
*Attorney, Agent, or Firm*—E. Kears Pollock

[57] ABSTRACT

An apparatus for manufacturing flat glass wherein a pool of molten metal is provided for supporting the glass during its manufacture is provided with a molten glass delivery facility that includes a refractory glass supporting member that extends into contact with the molten metal upon which the glass is to be delivered and formed. The refractory that contacts the molten metal is a gas impervious refractory, preferably a glass phase refractory, that permits the direct delivery of molten glass from the refractory support onto the molten metal while avoiding the introduction of fine seeds or bubbles into the glass.

12 Claims, 4 Drawing Figures

APPARATUS FOR THE MANUFACTURE OF FLAT GLASS HAVING A GLASS REFRACTORY DELIVERY PIECE AND METHOD OF INSTALLATION

BACKGROUND OF THE INVENTION

1. Field of the Invention

The present invention relates to the apparatus for manufacturing flat glass wherein the glass is formed while being supported on a surface of a pool of molten metal following its delivery thereto along an inclined support member which contacts the molten metal and provides continuous support for the glass throughout its delivery until it is supported on the molten metal. More particularly, this invention relates to a unique combination of elements comprising suitable means for supporting the molten glass throughout its delivery onto the pool of molten metal.

2. Brief Description of the Prior Art

It is known that molten glass can be delivered onto molten metal and formed into a continuous ribbon or sheet of glass according to the teachings of Heal, U.S. Pat. No. 710,357; of Hitchcock, U.S. Pat. No. 789,911; of Pilkington, U.S. Pat. No. 3,083,501 and U.S. Pat. No. 3,220,816; and of Edge and Kunkle, U.S. Pat. No. 3,843,346. In all of the prior art, molten glass is delivered over some rigid element, usually a refractory member, onto the molten metal. In all of the mentioned patents, except those of Pilkington, the molten glass is in contact with its supporting refractory element from the time it flows from a pool of molten glass in a tank or furnace until it is in contact with the molten metal upon which it is to be supported and formed. In the practice disclosed by Pilkington, the molten glass is delivered through a long, narrow canal and over a lip from which the molten glass falls onto the molten metal and spreads outwardly on the molten metal.

Several patents and publications illustrate devices for delivering molten glass from a tank or furnace onto a pool of molten metal containing a forming chamber wherein the device provides a supporting surface for the molten glass throughout its flow from the tank or furnace into the forming chamber until it is supported by the molten metal in the forming chamber. Several of these patents and publications disclose that the glass supporting member for delivering the stream or layer of molten glass onto the pool of molten metal may be inclined plane or other downwardly sloped member. Representative of the disclosures of such devices are U.S. Pat. No. 3,305,339 to Plumat, U.S. Pat. No. 3,442,636 to Kita et al and a paper of L. A. B. Pilkington delivered in 1969 (L. A. B. Pilkington, *Processing Royal Society*, London, Volume 314A, pages 1-25, 1969).

The device of Plumat employs an adjustable inclined plane having glass heaters mounted in it. The supporting inclined plane of Plumat consists of a metal which is heat-resistant and neutral with respect to the molten glass. Molybdenum and tungsten are suggested metals. Plumat also indicates that other refractory metals might be employed and that such metals could be covered with a sheet of noble metal, such as platinum, in the event that such metals are not neutral with respect to molten glass. The use of materials such as those suggested by Plumat would likely result in significant problems for the metals suggested by Plumat, including molybdenum, tungsten and platinum which are suitable for contact with molten glass, are not well suited for contact with molten metals, such as tin, which are suited for supporting molten glass to form it into flat glass.

The device suggested by Kita et al provides a glass supporting member that is fixed in place with respect to the glass forming chamber and is formed of a refractory material resistant to corrosion by the glass or of a material on which molten glass slides readily, such as graphite. Graphite is, of course, compatible with molten metal such as tin. Difficulties could be expected when employing a monolithic graphite piece as a delivery support for molten glass from a furnace to a forming chamber because of the fact that the glassmaking furnace is generally maintained under oxidizing conditions which would be detrimental to the life of graphite. Further, the use of graphite at a location at which continuous contact with molten glass occurs would likely result in the discoloration of glasses containing highly-oxidized colorants or the introduction of fine bubbles into glass of practically any composition.

Pilkington, at pages 13 and 14 of the mentioned article, describes the use of a refractory spout which dips into a pool of tin in a forming chamber. Molten glass is poured over the refractory spout and onto the surface of the pool of molten tin. Pilkington states that molten glass is chemically active and dissolves all refractory materials to some extent and that the rate of wear of the refractory surface is greatly accelerated at the tin-glass-refractory interface where the spout is dipped into the tin. Pilkington further indicates that glass that has been in contact with the refractory spout becomes contaminated causing optical defects in bottom surfaces of finished glass. Eventually, as described in Pilkington in that same article, the problem associated with refractory glass reaction in the vicinity of molten tin refractory glass interface was avoided by simply shortening the spout so that it was not in contact with molten tin. This eliminated the interfacial region at which the undesirable reactions were believed to predominately occur. As reflected in the earlier-mentioned patents of Pilkington, this feature of eliminating the continuity of support for molten glass and, thus, eliminating the refractory molten metal interface constituted the basic concept of the inventions of Pilkington relating to float processes.

In the practice of a float process such as that described by Pilkington, molten glass falls freely from a refractory support onto the surface of a pool of molten metal, such as tin, spaced from a refractory support. The glass then flows rearwardly under the refractory support and outwardly from it on a surface of the pool of molten metal to form a layer or body of molten glass which can be drawn along the surface to form a continuous sheet of glass. The flow of molten glass beneath such a refractory spout or support is called a wetback flow and is directed for a short distance in a direction opposite to the general movement or advance of glass through the system. This opposite or rearward flow moves into the vicinity of, or into contact with, a back perimeter wall of the forming chamber known as a wetback. From time to time defects are encountered in the glass formed in such a process which defects have been found to be related to contamination conditions, undesirable stagnation of glass flow beneath the glass delivery spout, ingress of air through the wetback and devitrification of glass in that region of a forming chamber. Another problem solved by the present invention is that by the provision for a readily replaceable refractory piece, short circuiting glass flows past worn jamb blocks and worn lips are easily avoided. While such problems of contamination and stagnation in a rearward flow region do not exist in a process such as that described by Edge and Kunkle, there exists in the United States today and throughout the world a substantial number of glass forming facilities built according to the teachings of Pilkington prior to the development of the process described and claimed by Edge and Kunkle. Due to the substantial structural differences between the delivery facilities of such existing units and the structural features of a glass forming chamber and its associated molten glass delivery facilities such as described by Edge and Kunkle, there has been presented an incentive to develop some means for modifying existing float forming facilities employing free-fall molten glass delivery systems to avoid the problems associated with wetback or rearward flows. Modifications have been desired which would be more simple and more expedient than completely rebuilding the delivery facilities of such units and altering the relative elevations of the glass forming chambers and the glass tanks or furnaces to provide the kind of direct delivery system described by Edge and Kunkle.

The invention of the applicants comprises an apparatus for accomplishing such a purpose.

SUMMARY OF THE INVENTION

This invention is applied as an improvement to any flat glass forming facility in which a support, spout or lip is provided for delivering molten glass along a sloped surface down onto the surface of a pool of molten metal contained in a forming chamber. According to this invention, a gas impervious, glass, ceramic or glass-ceramic refractory member serves as a metal-contacting portion of the glass support member. The gas impervious refractory has a permeability of less than about $5 \times 10^{-3}$ darcies. The gas impervious refractory may constitute only an extreme portion of the glass supporting member of the glass delivery facility or may constitute a major portion of the member, and when convenient from the standpoint of construction or fabrication, may constitute the full lip or spout of a delivery facility. In any event, the glass supporting portion of the delivery facility is made of such a gas impervious refractory throughout the region which can, and during operation does, serve as a common interface for the molten glass, the molten tin and the refractory.

In a preferred embodiment of the invention, the portion of the refractory in the region of molten metal contact has a finely smoothed surface with a roughness of less than about 10 microinches. Materials having lesser smoothness (greater roughness) than this are less desirable since they are believed to provide capillary and subcapillary space for the nucleation and accumulation and transmission of gas which may be encountered as a dissolved or dispersed species in the molten metal and which, if allowed to accumulate in the vicinity of molten glass delivery onto the molten metal (where the glass is at least viscous), could be intermittently released into the glass surface causing bubbles in its undersurface. By employing a glass delivery piece that has the degree of smoothness described here, the propensity of the refractory to transmit gases or to permit their nucleation in the vicinity of molten glass delivery is substantially diminished.

In preferred embodiments of this invention, the gas impermeable refractory has a hydrogen diffusivity of less than 10 centimeters. In general, the preferred embodiments of this invention are glass-phase refractories, although as mentioned above, the refractories may be ceramics or glass-ceramics. In general, refractories having at least their surface portions formed or finished by fushion processes are desired since refractories formed by molding or casting, followed by drying, inherently possess minute passages through which gases may be transmitted by diffusion or by transpiration since their methods of manufacture essentially involve the removal of water or like species from them by such mechanisms during their preparation. A particularly preferred material for use as the metal contacting portions of a delivery facility is essentially pure fused silica glass (greater than 99.9 per cent $SiO_2$, for example) such as materials sold as clear-fused quartz. Other representative materials also believed to be particularly useful in the practice of this invention are borosilicate glass (when making low-melting glass); beta spodumene; rebonded fused silica that is superficially fused after forming; fused alumina; and fusion products comprising alumina or silica in combination with conventional fluxing agents, such as soda. The alumina-flux combinations preferably contain more than 85 percent by weight alumina and the silica-flux combinations preferably contain more than 90 percent by weight silica.

In a particularly preferred embodiment of this invention, a lip extension piece of clear-fused quartz or alumina is mounted along the forward tip of a conventional spout or lip for delivering molten glass to a forming chamber in a free-fall process. The quartz glass or alumina piece fills the space between the tip of the lip and the surface of the pool of molten metal contained in the forming chamber. It extends across the full width of the lip so that molten glass flowing over the lip will continue its flow over the lip extension piece and be fully supported by it until it is delivered onto and supported by the pool of molten metal. The lip extension piece prevents the rearward flow of the molten glass so that stagnation and contamination of the glass in a rearward flow region beneath the spout or lip is avoided. The molten glass readily seals any gap or space between the lip and the lip extension piece and during operation molten glass flows without disruption over the outer lip, over the lip extension piece and onto the pool of molten metal. The lip extension piece may be mounted at the sides of the chamber by means of rods or cooling pipes extending through the refractory lip extension piece and outwardly through the sides of the chamber. When cooling pipes are employed, the cooling pipes are connected to a source and sink for coolant so that coolant, such as water, may be directed through them during operation. A preferred technique for mounting a lip extension piece is to provide a pair of blind holes in each end of the piece and to insert the fingers of a two-fingered fork into each pair of holes. The two-fingered forks are mounted on thermally insulated arms which are, in turn, mounted to the forming chamber at its sides. The arms may be internally cooled, if desired, by making them as bent tube heat exchangers to which the forks are connected. In this embodiment of the invention, the fingers of the forks are preferably high-temperature-resistant metals or alloys. The fingers preferably extend into blind holes having depths of from one to five centimeters. Another mounting technique involves using a notched extension piece and notched guides that interlock to hold them in place.

One of the beneficial features of this embodiment of the invention which comprises mounting a lip extension piece onto an existing lip or spout of a float forming chamber is that existing apparatus may be readily modified without a major shutdown of the process and without cooling the equipment for repair. It is possible to insert a refractory lip extension piece into an operating forming chamber and, while the glass continues to advance through the chamber, to force the refractory piece downwardly through the advancing fluid glass, position it and allow the glass to continue to flow over it without interruption in the flow and advance of glass. One of the surprising side benefits of this expedient procedure for installing a refractory lip extension piece is that during its installation the lip extension piece becomes sealed in place with glass and even though the glass behind and adjacent the piece may become devitrified, there is no indication that the trapped glass serves as a source of seeds or bubbles in the glass being formed following the installation of the refractory lip extension piece.

In one aspect, this invention comprises a method for modifying a glass forming chamber having a lip that is spaced above a pool of molten metal (tin) that is maintained in the chamber. The method comprises several steps. An elongated lip extension piece is inserted into the headspace of an operating chamber. The headspace is under substantially reducing conditions so that the lip extension piece is initially cleaned by insertion into it. The lip extension piece is held above the advancing glass and allowed to approach thermal equilibrium with it. The lip extension piece is then forced downwardly through the advancing molten glass and moved beneath it to a position in contact with the lip. Contact is preferably maintained with the underlying molten tin. Once the lip extension piece is in position, it is mounted at the sides (its ends) into fixed relation with the forming chamber.

The invention may be further appreciated from the drawings accompanying this description.

DESCRIPTION OF THE PREFERRED EMBODIMENTS

Figure 1:
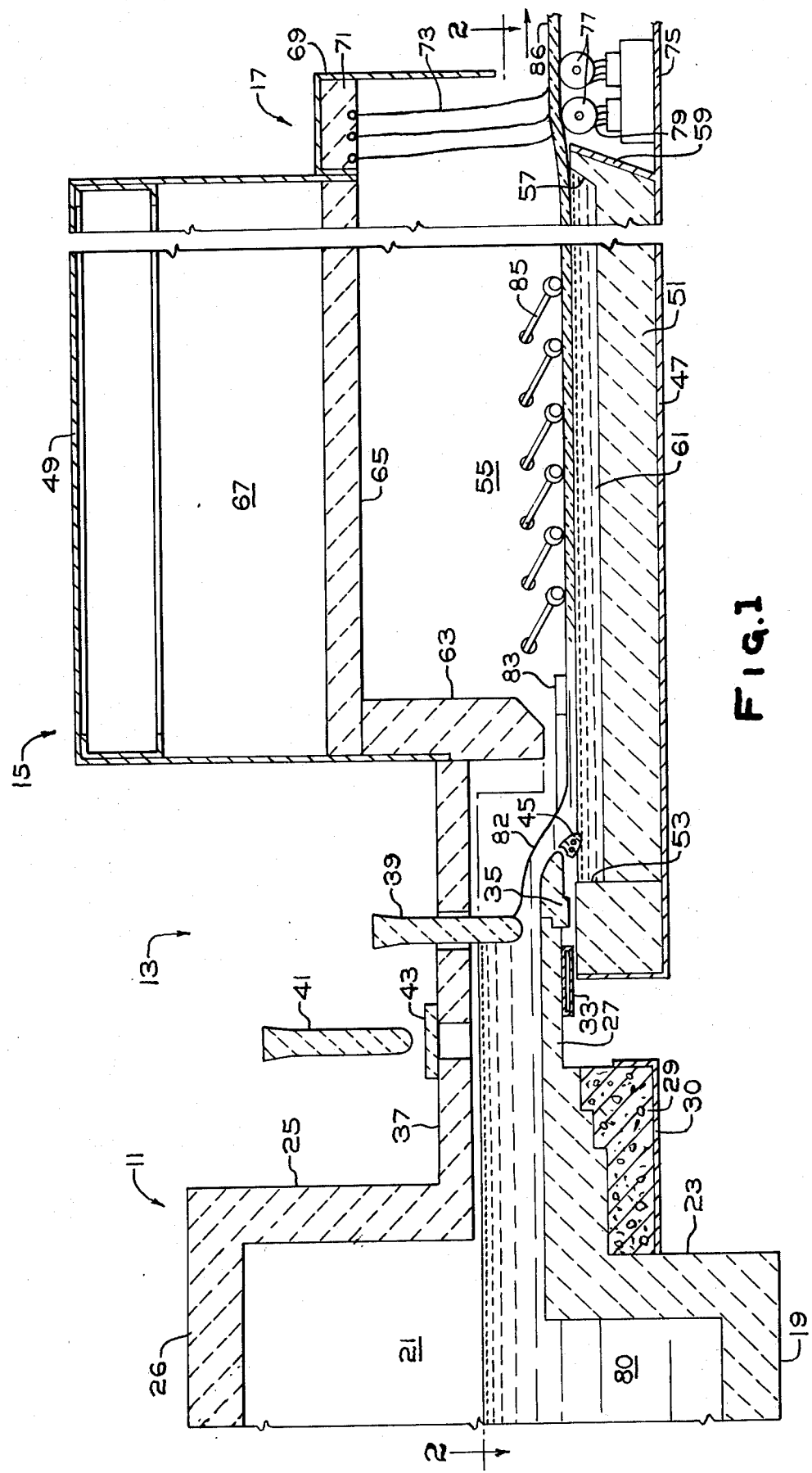
FIG. 1 is a partial sectional view of a longitudinal elevation of a glassmaking facility according to this invention showing the novel molten glass delivery facility which joins the glassmaking furnace to the glass forming chamber.
Figure 2:
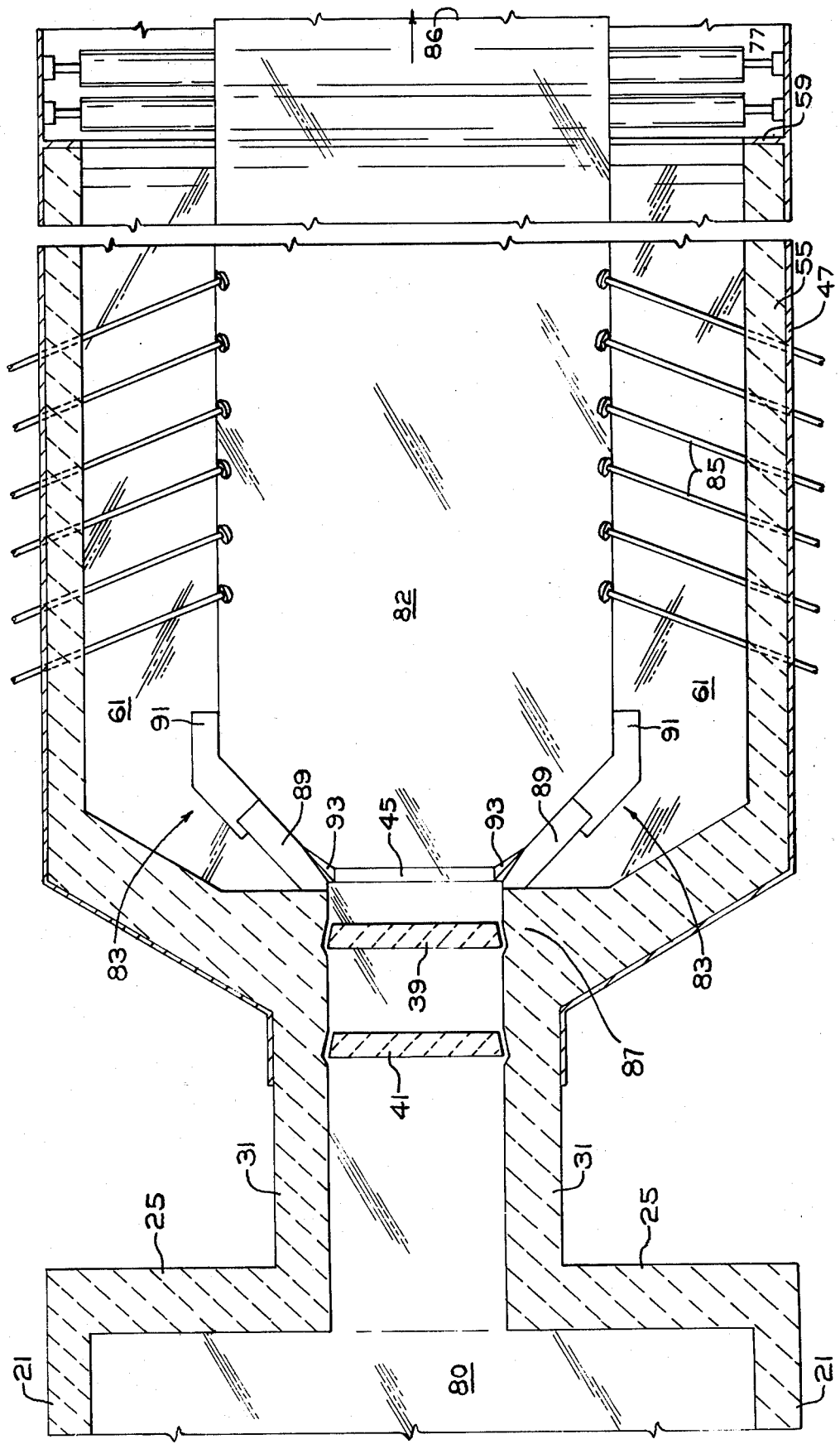
FIG. 2 is a partial sectional view of a longitudinal plan of the glassmaking facility shown in FIG. 1 taken along section line 2—2 of FIG. 1.

Referring now to FIGS. 1 and 2, there is shown a glassmaking facility including a glassmaking furnace and a glass forming chamber. A glassmaking furnace or tank terminating in a refiner or conditioner 11 is connected through a molten glass delivery facility 13 to a glass forming chamber 15, which in turn leads to a glass take-out apparatus 17.

The glassmaking furnace or tank with its terminal conditioner 11 comprises a tank bottom 19, side walls 21, which include lower portions called basin walls and upper portions called breast walls, a front end basin wall 23 and an upper front wall 25. The bottom 19 and basin wall portions of the side walls and end walls form a container for holding molten glass to condition and refine it for delivery to the glass forming chamber 15. A crown or roof 26 overlies the side walls and ends of the refiner or conditioner 11 and is spaced above an intended glass line to provide a headspace.

In a typical float forming facility to which this invention preferably applies, the molten glass delivery facility 13 comprises a canal having a canal bottom 27 (preferably provided with insulation 29 having an insulation cover 30 disposed about the insulation 29) and canal sides 31. The canal bottom 27 and sides 31 form a channel through which molten glass can flow from the conditioner 11 to the forming chamber 15. The canal bottom 27 and sides 31 may be supported from beneath and may be provided with a cooler 33 that rests on or is an integral part of a lower portion of the forming chamber to be described below. At the end of the canal bottom 27 there is provided a spout or lip 35 as in a conventional float forming facility with the lip or spout 35 mounted at an elevation for pouring glass off its sloped front face and allowing it to fall during delivery for forming. The sloped front face of a lip is usually steeply sloped with an angle of inclination only a few degrees from vertical. The canal further includes a roof 37 overlying the canal sides 31 and extending from the upper front wall 25 of the furnace or tank to the forming chamber 15.

Extending downwardly through a slot in the canal roof 37 is a control tweel or metering member 39, which may be raised or lowered by means (not shown) in order to vary the size of the opening through which molten glass is delivered for forming. The bottom edge of the control tweel 39, the upper surface of the canal bottom 27 and spout 35 and the inside faces of the canal sides 31 define the opening through which molten glass is delivered for forming. A backup tweel 41, also mounted by conventional means (not shown), is maintained in a position so that it may be used in the event the control tweel requires replacement or repair or in the event glass flow is desired to be shut off entirely to make repairs or replacement of equipment in the vicinity of the control tweel 39. A slot in the roof 37 through which the backup tweel 41 may be lowered is generally covered by a cover tile 43 during operation.

This invention provides, as an essential feature, a refractory member for supporting molten glass during its delivery to maintain support through its time of delivery and to prevent the rearward flow of molten glass upon delivery for forming. In the embodiment of the invention illustrated in FIGS. 1, 2 and 3, this refractory member constitutes a spout or lip extension piece 45. The lip 35 in combination with the lip extension piece 45 comprises a sloped glass supporting member that extends downwardly into contact with the molten metal of the forming chamber. This lip extension piece 45 is a gas impervious material having a permeability of less than about $5 \times 10^{-3}$ darcies, preferably having a hydrogen diffusivity of less than about 10 centimeters and preferably having a surface smoothness of about 0.3 to 200 microinches. Preferred materials for use as a lip or spout extension are fused quartz (essentially pure fused silica glass greater than 99.9 percent $SiO_2$), fused alumina, fused alumina-silica or fused alumina-soda compositions, borosilicate glass and glass-ceramics, including beta spodumene. The lip extension piece 45 preferably includes blind holes running into its ends and aligned along its length (which corresponds to width of the forming chamber). A pair of two-fingered forks extend into the blind holes at the ends of the extension piece and are mounted on water-cooled, thermally-insulated arms which extend to or through the side walls of the forming chamber and are mounted in fixed relation to it. Alternatively, holes may be provided which extend fully through the length of the lip extension piece. In such an embodiment, rods or pipes, such as pipes 46 shown in FIG. 3, may be inserted through these holes. The pipes 46 may be provided with thermal insulation about them beyond the ends of the refractory piece 45 and may be mounted on the walls of the forming chamber. Alternatively, the pipes 46 may be mounted to extend through the walls of the forming chamber and connected to it externally. In the instance where pipes 46 are employed to hold the refractory piece 45 in place, the pipes may be connected to a conventional source of cooling water or other like coolant which is directed through the pipes during operation in order to cool the refractory piece 45 and maintain the stability of the pipes 46 used to hold it in place.

The glass forming chamber 15 includes a bottom casing 47 and an upper casing 49. The casings form a box-like structure which constitutes an enclosed chamber that may be isolated from the outside environment when producing glass. Mounted inside the bottom casing 47 is a refractory bottom 51. Surrounding the refractory bottom 51 nd extending upwardly from it are perimeter block portions including a back perimeter block 53 in the vicinity of what has been known in the past as a wetback region beneath and to the rear of the spout 35. Side walls 55, also comprising refractory material, extend upwardly within the lower and upper casings at each side of the forming chamber 15. At the downstream or exit end of the forming chamber (that is the end to the right in FIGS. 1 and 2 and the end toward which glass advances during operation) there is provided an exit lip 57 extending a short distance upwardly from the refractory bottom 51. A metal lip casing 59 serving as a supporting and mounting member for the lip 57 extends upwardly from the bottom casing 47 and transversely across the width of the forming chamber. A pool of molten metal, preferably tin 61, is maintained in the container defined by the perimeter block 53, side walls 55, including perimeter block portions, the exit lip 57 and refractory bottom 51. It is on this pool of molten metal 51 that glass is supported and formed into a continuous sheet or ribbon of flat glass.

Near the inlet end or upstream end of the forming chamber (that is the end of the forming chamber to the left of FIGS. 1 and 2) there is a refractory lintel 63. Extending from that refractory lintel 63 across the width of the forming chamber and throughout its length is a ceiling or roof 65, which is spaced above the pool of molten metal 61 at a sufficient distance to provide an operating headspace into which a protective reducing atmosphere may be directed. Above the roof or ceiling 65 is a service space 67 defined by the upper portion of the upper casing 49. In the service space 67 there may be provided heat exchange facilities, electric service facilities for operating heaters for the chamber or other service as is conventionally known.

The glass take-out facility 17 comprises an exit canopy 69 separate from the bath casing which extends over the region where glass is to be withdrawn from the forming chamber 15. The exit canopy 69 is preferably provided with thermal insulation 71 and has mounted in it one or more drapes 73 which extend transversely across the width of the forming chamber and provide a seal for the chamber to maintain the protective reducing atmosphere introduced into the headspace of the forming chamber. Beneath the exit canopy the lift-out facility comprises a wall or pit having a base 75 upon which lift-out rolls may be mounted. One or more lift-out rolls 77 may be mounted axially transversely across the width of the lift-out facility 17 just downstream of the exit lip 57 of the forming chamber 15. The lift-out rolls are preferably provided with roll seals 79.

During operation, a pool of molten glass is provided in the conditioner 11 of the glassmaking furnace. From the pool of molten glass 80 there is withdrawn a layer or stream of molten glass 82 which flows along the channel defined by the canal bottom 27 and sides 31 which is metered by the control tweel 39 and flows over the spout or lip 35, over the refractory lip extension 45 and directly onto the surface of the pool of molten metal 61 maintained in the forming chamber.

In a preferred embodiment of this invention, as the layer or stream of molten glass is delivered onto the forming chamber, it encounters diverging guides 83 which extend outwardly and in a downstream direction from the ends of the lip extension 45 (that is, from the sides of the spout or lip 35). The glass may, if desired, be permitted to flow unhindered laterally but it is preferred that as it is delivered, its lateral movement or flow is restrained by such guides. The guides may be nonwetting guides such as guides make of graphite or the like; however, in a preferred embodiment of this invention, the diverging guides are made of material which is readily wet by molten glass, for example, rebonded fused silica that is superficially fused, alumina or the like. As the glass advances along the surface of the molten metal 61 between the guides 83, it is gradually caused to widen and thin until a desired width is achieved. Then as the glass continues to advance along the surface of the pool of molten metal, it is engaged at its edge potions by pairs of edge rolls 85 which are used to apply both outwardly lateral and longitudinal tractive forces to the glass in order to maintain it at constant width and to advance it along the surface of the pool of molten metal while permitting it to cool to form a dimensionally stable, continuous ribbon or sheet of glass 86. As a finished sheet or ribbon of glass 86 is formed, it is advanced over the exit lip of the forming chamber, lifted slightly and then conveyed by the lift-out rolls 77 toward an annealing lehr where the continuous sheet or ribbon of glass may be annealed for cutting and ultimate use.

Looking now at the delivery facility in more detail, it may be seen that the inner faces of the canal, which form the sides of the channel through which molten glass is delivered, terminate in jamb blocks 87. The guides, which are employed in the preferred embodiment of this invention as shown in FIGS. 1 and 2, extend outwardly from the sides of the spout or ends of the lip extension 45 and may be notched to engage the downstream faces of the jamb blocks 87. In a particular preferred embodiment of this invention, each guide comprises a straight guide section 89 and an end guide section 91 having an angled portion at its terminus so that in combination the guides provide at their downstream terminus parallel guide portions for initially establishing the advance of the glass beyond the guides in a direction that is best suited for maintaining the ribbon or sheet of glass at a constant width throughout the remainder of its formation. The straight guide sections 89 may be beveled at their ends adjacent the spout or lip in order to provide a smooth and continuous surface from the spout and lip in combination with the jambs to the inside facing surfaces of the guides so that no significant irregularities are provided to disrupt in the flow of molten glass and cause turbulence to the glass adjacent the guide 83. In a particularly convenient design, a small triangular-shaped filler piece 93 of material similar to either the guide material or the lip extension material may be mounted in a corner portion between the lip extension 45 and the guide 83 in order to avoid having a space into which glass could flow and become stagnant with resultant divitrification and the development of bubbles which could be introduced into the glass being formed. These corner pieces 93 also prevent the establishment of any division of glass flow through an opening so that there will be no continuous rearward flow of glass and consequently no flow of glass around the guides 83.

Figure 3:
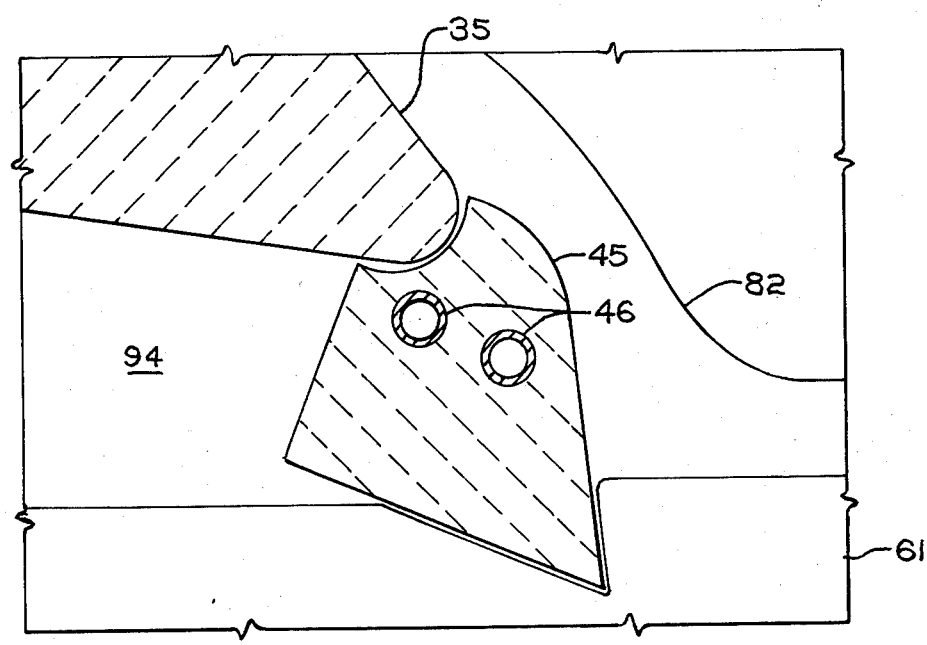
FIG. 3 is a detailed sectional view illustrating the preferred embodiment of this invention and showing how a refractory lip extension piece is mounted against an existing lip or spout.

Looking now at FIG. 3, there is seen an accumulation of high-viscosity glass 94 on the back (non-glass supporting) surface of the lip extension piece 45. This glass seals the assembly and prevents the introduction of bubbles into the flowing glass 82 from the tin beneath and to the rear of the lip extension piece 45. This layer or accumulation of high-viscosity glass is provided, in a preferred embodiment of the invention, by inserting the lip extension piece into an operating unit that is under reducing conditions and in which a layer of molten glass is being delivered and advanced. The insertion of the lip extension piece is accomplished by forcing it through the advancing layer of molten glass and trapping some of the existing glass beneath the lip of the chamber as a coating or accumulation of glass that cools slightly to become highly viscous. Even if some devitrification of the glass 94 occurs, it does not appear to cause any detrimental effect because of the isolation provided between it and the flowing glass 82. By inserting the lip extension piece during operation, it is free of an accumulation of tin oxide on its surfaces which may occur if the lip extension piece is in place when a forming chamber is initially started.

Figure 4:
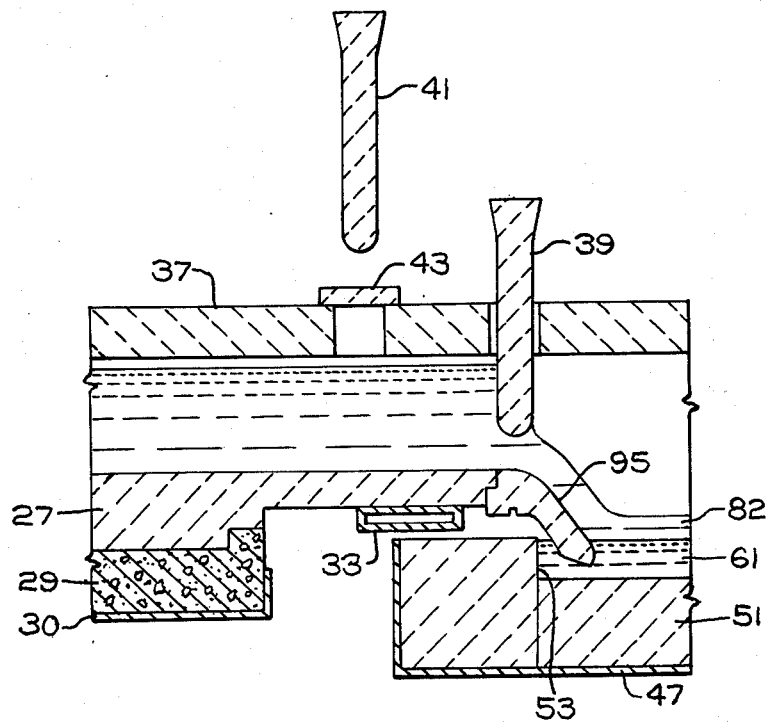
FIG. 4 is a partial sectional view of a longitudinal elevation of a delivery facility illustrating an alternate embodiment of this invention.

Looking now at FIG. 4, there is seen an alternative embodiment of this invention. In this invention the elements of the structure having numbers similar to the elements of the structure already described with reference to FIGS. 1, 2 and 3, are the same as that illustrated embodiment. In this embodiment of the invention, rather than having a spout or lip of conventional length and made of conventional spout or lip materials with a lip extension provided to make a portion of the lip assembly, namely the lip extension, of suitable material for dipping into the molten metal, this embodiment of the invention is provided with a spout or lip 95 having a sufficient length to extend downwardly into contact with the pool of molten metal 61. This embodiment of the invention differs from the dipped lips of the past as described above in that the lip or spout 95 in this embodiment of the invention is made of a gas impervious material having a permeability of less than $5 \times 10^{-3}$ darcies, preferably having a hydrogen diffusion of less than 10 centimeters and also preferably having a surface smoothness equal to that mentioned above with respect to the lip extension 45.

Throughout this disclosure, the properties of refractories (glass, ceramic and glass-ceramic) which are useful in this invention are discussed. The gas permeability of the refractories which are useful is determined according to ASTM Standard C 577. The hydrogen diffusivity is defined as the pressure difference, at equilibrium, between a hydrogen filled chamber and the ambient atmosphere when the chamber has a one-inch (2.54 cm) thick refractory test specimum as one wall of the chamber and was initially filled with hydrogen at one atmosphere pressure and sealed. The pressure differnece is indicated by a water manometer that is connected to the chamber and open to the ambient atmosphere. A decrease in the chamber pressure occurs due to the diffusion of hydrogen through the refractory. The remaining walls of the chamber are brass and are presumed to support no hydrogen diffusion. The surface smoothness of each refractory piece in question is determined by using a stylus-type instrument sold under the name Taylor-Hobson TALYSURF No. 4. Apparent porosity is determined according to ASTM Standard C-20.

The following table indicates the physical properties of the preferred materials for use as the metal-contacting portion of the glass supporting member of delivery facility, whether it is a lip extension piece or an entire lip.

TABLE I

PROPERTIES OF REFRACTORIES

| PROPERTY | MATERIAL | | |
| --- | --- | --- | --- |
| | Clear Fused Quartz (99.9% Silica Glass) | Fused Cast Alpha-beta-alumina | Rebonded Fused Silica |
| Diffusivity (centimeters) | 0.9 | 3 | 80+ |
| Permeability ($\times 10^{-3}$ darcies) | 0 | 0-3 | 3-6 |
| Surface Roughness (microinches) | 0.2-1.5 | 140-400 | 45-150 |
| Apparent Porosity (per cent) | 0 | 1-2 | 18-25 |

In addition to the above listed properties, the alumina and rebonded silica which do not have an apparent porosity have pore size distributions as follows:

TABLE II

PORE SIZE DISTRIBUTION
(Per cent smaller than indicated size)

| PORE DIAMETER (Microns) | MATERIAL | |
| --- | --- | --- |
| | Fused Cast Alpha-beta-alumina | Rebonded Fused Silica |
| .02 | 0 | 0 |
| .05 | 1 | 3 |
| .10 | 5 | 15 |
| .20 | 15 | 40 |
| .30 | 32 | 75 |
| .40 | — | 93 |
| .50 | 78 | 98 |
| 1.0 | 90 | 99 |
| 2.0 | 93 | 99 |
| 5.0 | 95 | 99 |
| 10.0 | 96 | — |
| 20.0 | 98 | — |

While this invention has been described with particular reference to certain preferred embodiments, those skilled in the art of glassmaking will readily recognize that variations and modifications may be made which, nevertheless, remain within the scope of the invention claimed here. For example, the present invention may be applied to a glass forming chamber in which no guides are provided and in which a freshly delivered layer of molten glass is permitted to spread laterally unhindered as it advances for forming. The present invention may be applied to a forming chamber that is provided with a glass sheet or ribbon lift-out facility that lifts glass upwardly from the forming chamber rather than substantially horizontally as in the illustrated embodiments. The present invention may be applied to a forming chamber-glass furnace combination having a wide delivery facility having a channel for delivering glass that has a width on the order of the width of a desired finished ribbon or sheet of glass. The invention is applicable to the formation of any glass of any composition that is conveniently formed by a floatation method. It is, for example, possible to use a lip extension made of a material that is relatively prone to reaction with, or dissolution by, the glass being formed since the lip extension can serve as a wear piece that may be frequently replaced without major disruption of a continuous glass forming process. This aspect of this invention has particular economic benefit, since several days of glass production are lost whenever a lip must be replaced due to wear. In contrast, a lip extension piece, if worn, can be replaced in a few hours without ever cooling a unit or stopping the delivery of glass to it.

We claim:

1. An apparatus for making glass comprising a glass melting, refining and conditioning furnace and a glass forming chamber containing a pool of molten metal for supporting glass while it is being formed into a continuous, dimensionally stable sheet of glass, the furnace and forming chamber being joined by a molten glass delivery facility comprising an elongated channel having a bottom positioned at an elevation spaced over the top of the molten metal, side members, a metering member over the end of said channel and wherein the channel bottom terminates with a glass supporting member that extends in a slope downwardly into contact with the molten metal in the forming chamber, said glass supporting member being a gas impervious refractory having a permeability of less than about $5 \times 10^{-3}$ darcies at least in the portion thereof which contacts the molten metal.

2. The apparatus according to claim 1 wherein the gas impervious refractory comprises a lip extension piece mounted adjacent the lip, the combination serving as the glass supporting member.

3. The apparatus according to claim 1 wherein the gas impervious refractory comprises an elongated lip extending from the elongated channel bottom member downwardly into contact with the molten metal and serving as the end of the glass supporting member.

4. The apparatus according to claim 1 wherein the gas impervious refractory has a hydrogen diffusivity of from zero to 10 centimeters of water.

5. The apparatus according to claim 1 wherein the gas impervious refractory is a refractory selected from the group consisting of fused quartz, fused alumina, re-bonded fused silica, fused alumina-flux compositions, fused silica-flux combinations, borosilicates and betaspodumene.

6. The apparatus according to claim 5 wherein the gas impervious refractory is clear-fused quartz.

7. The apparatus according to claim 2 wherein cooling pipes are extended through the lip extension piece and transversely across the forming chamber for connection to a source of coolant at a side of the forming chamber.

8. The apparatus according to claim 2 wherein the lip extension piece is clear-fused quartz.

9. The apparatus according to claim 2 wherein glass is adhered to a surface of the lip extension piece facing away from its surface for supporting molten glass.

10. The apparatus according to claim 2 wherein glass is adhered to a surface of the lip extension piece and in contact with molten metal beneath a flowing glass-refractory-molten metal interface.

11. A method of modifying a glass forming chamber having a lip spaced above a pool of molten metal for delivering a layer of molten glass thereto, comprising the steps of inserting a refractory lip extension piece into the headspace of a glass forming chamber maintained under substantially reducing conditions above an advancing layer of molten glass, allowing the refractory lip extension piece to approach thermal equilibrium with the molten glass and its surroundings, forcing the refractory lip extension piece downwardly through the advancing layer of molten glass, moving the refractory lip extension piece into a position in substantial contact with the lip of the chamber, beneath the molten glass and in contact with the molten metal and fixing the refractory lip extension piece in that position.

12. The apparatus according to claim 1 wherein the gas impervious refractory expands partially beneath the surface of the molten metal.

* * * * *